(12) United States Patent
Shlomo

(10) Patent No.: US 10,811,952 B2
(45) Date of Patent: Oct. 20, 2020

(54) SYSTEMS, METHODS, AND DEVICES FOR FAST WAKEUP OF DC-DC CONVERTERS INCLUDING FEEDBACK REGULATION LOOPS

(71) Applicant: Cypress Semiconductor Corporation, San Jose, CA (US)

(72) Inventor: Oren Shlomo, Haifa (IL)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/369,423

(22) Filed: Mar. 29, 2019

(65) Prior Publication Data

US 2020/0076294 A1    Mar. 5, 2020

Related U.S. Application Data

(60) Provisional application No. 62/727,154, filed on Sep. 5, 2018.

(51) Int. Cl.
| | |
|---|---|
| *H02M 1/14* | (2006.01) |
| *H02M 3/335* | (2006.01) |
| *H02M 1/00* | (2006.01) |
| *H02M 3/07* | (2006.01) |

(52) U.S. Cl.
CPC ......... *H02M 1/14* (2013.01); *H02M 3/33507* (2013.01); *H02M 3/07* (2013.01); *H02M 2001/0032* (2013.01); *H02M 2001/0035* (2013.01)

(58) Field of Classification Search
CPC . H02M 2001/0032; H02M 2001/0035; H02M 1/14

USPC ............... 363/59, 60; 307/109, 110; 327/56
See application file for complete search history.

(56) References Cited

U.S. PATENT DOCUMENTS

| | | | |
|---|---|---|---|
| 5,734,291 A | 3/1998 | Tasdighi et al. | |
| 5,768,115 A * | 6/1998 | Pascucci ............... | G11C 5/145 307/110 |
| 6,396,324 B1 | 5/2002 | Hsu et al. | |
| 6,995,995 B2 | 2/2006 | Zeng et al. | |
| 7,218,085 B2 | 5/2007 | Abedinpour et al. | |
| 7,391,630 B2 | 6/2008 | Acatrinei | |

(Continued)

FOREIGN PATENT DOCUMENTS

EP       1538736 A2    6/2005

OTHER PUBLICATIONS

Hye-ImJeong, "High Performance Charge Pump Converter with Integrated CMOS Feedback Circuit" www.transeem.org, Apr. 11, 2014; 5 pages.

(Continued)

*Primary Examiner* — Alex Torres-Rivera

(57) ABSTRACT

Systems, methods, and devices implement direct current (DC)-DC converters having fast wake up times and low ripple effects. Methods include determining a DC-DC converter is to be transitioned from an operational mode to a low power mode, and storing a voltage at an input of a comparator coupled to an input of a charge pump, the voltage being stored in a feedback capacitor of a feedback regulation loop. The methods further include uncoupling a voltage trimming circuit from the input of the comparator, and maintaining, at least in part, the stored voltage at the feedback capacitor during the low power mode.

20 Claims, 13 Drawing Sheets

(56) References Cited

U.S. PATENT DOCUMENTS

| | | | |
|---|---|---|---|
| 8,232,835 B2* | 7/2012 | Kim | H02M 3/07 |
| | | | 323/289 |
| 8,421,432 B2 | 4/2013 | Hawkes | |
| 8,587,265 B2 | 11/2013 | Nishimori et al. | |
| 9,184,582 B2 | 11/2015 | Koch et al. | |
| 9,774,265 B2 | 9/2017 | Pasqua et al. | |
| 9,949,023 B2 | 4/2018 | Astgimath et al. | |
| 9,954,443 B2 | 4/2018 | Manor et al. | |
| 9,958,888 B2 | 5/2018 | Wei et al. | |
| 10,063,143 B1 | 8/2018 | Fan et al. | |
| 2008/0024096 A1* | 1/2008 | Pan | G11C 5/145 |
| | | | 323/271 |
| 2011/0018616 A1 | 1/2011 | Li et al. | |
| 2014/0055197 A1* | 2/2014 | Khlat | H03F 3/45663 |
| | | | 330/127 |
| 2014/0375293 A1* | 12/2014 | Pan | H02M 3/07 |
| | | | 323/293 |
| 2015/0180333 A1 | 6/2015 | Jenkner et al. | |
| 2017/0170722 A1* | 6/2017 | Jung | H02M 1/36 |
| 2017/0288532 A1* | 10/2017 | Zhou | H02M 1/08 |

OTHER PUBLICATIONS

International Search Report for International Application No. PCT/US19/45726 dated Dec. 11, 2019; 4 pages.
Written Opinion of the International Searching Authority for International Application No. PCT/US19/45726 dated Dec. 11, 2019; 4 pages.

* cited by examiner

SYSTEMS, METHODS, AND DEVICES FOR FAST WAKEUP OF DC-DC CONVERTERS INCLUDING FEEDBACK REGULATION LOOPS

CROSS-REFERENCE TO RELATED APPLICATIONS

This application claims the benefit under 35 U.S.C. § 119(e) of U.S. Provisional Patent Application No. 62/727,154, filed on Sep. 5, 2018, which is incorporated by reference herein in its entirety for all purposes.

TECHNICAL FIELD

This disclosure generally relates to direct current (DC)-DC converters, and more specifically, to the implementation of regulated feedback loops for DC-DC converters.

BACKGROUND

DC-DC converters implemented in electronic devices may include various components, such as a charge pump. Such DC-DC converters may also include other components that provide an input to the charge pump, such as a voltage trimming circuit. Moreover, such DC-DC converters may toggle between different operational modes to conserve power. For example, such DC-DC converters may toggle between an active mode in which all components are operational, and a standby mode in which several, if not all, components are deactivated and powered down to save on power consumption. While DC-DC converters are able to toggle between an active mode and a standby mode, there is often a significant delay associated with the powering up of the components, such as the voltage trimming circuit, when transitioning back to an active state. Accordingly, some DC-DC converters remain limited in their ability to quickly, effectively, and efficiently transition between operational modes.

DETAILED DESCRIPTION

Figure 1:
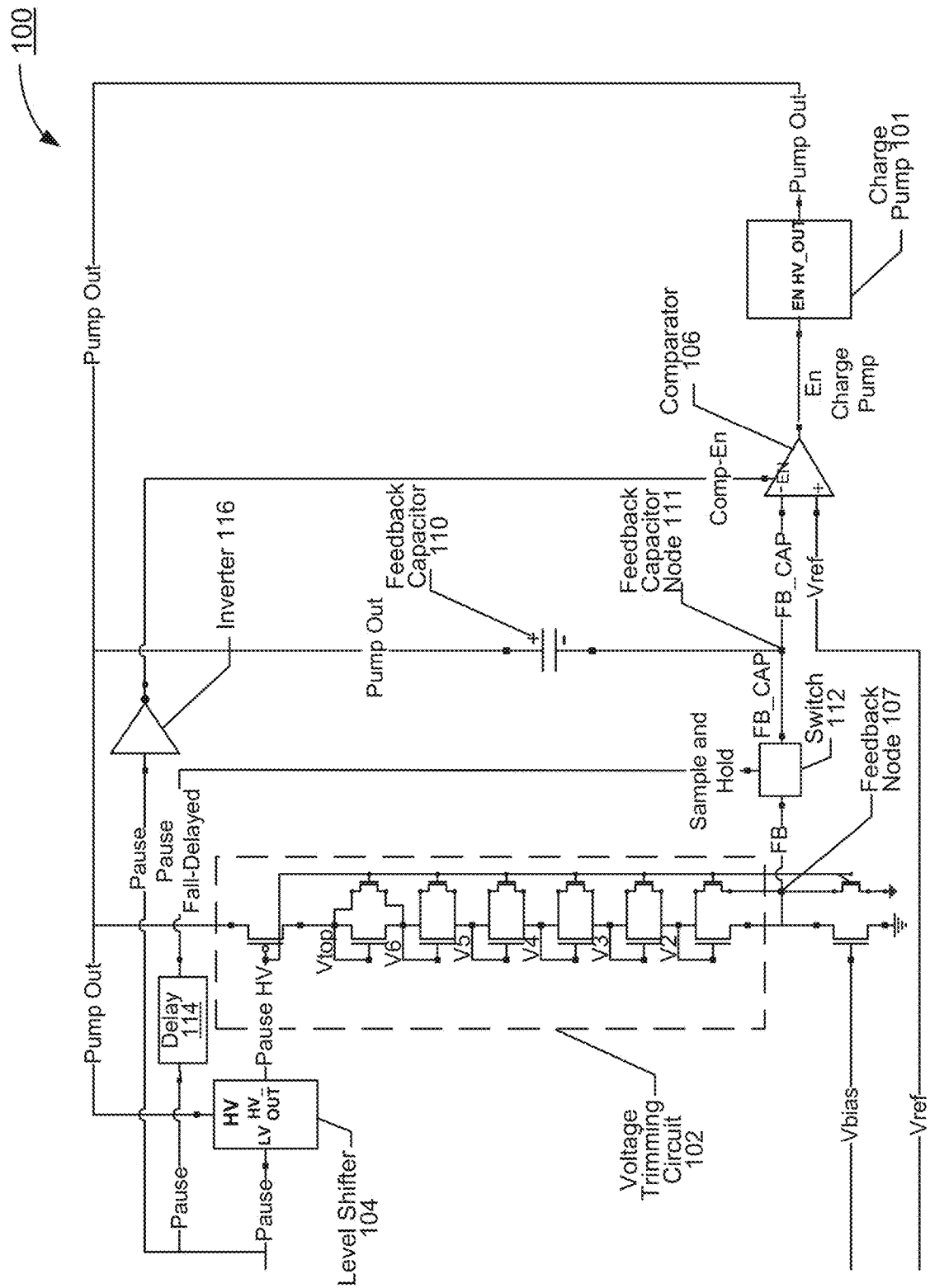
FIG. 1 illustrates an example of a DC-DC converter, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In various embodiments, DC-DC converters are utilized in electronic devices to generate and provide power supply signals for various components of such electronic devices. As will be discussed in greater detail below, such electronic devices may be memory devices that include voltage/current supply blocks. Such DC-DC converters may include components, such as a charge pumps and voltage trimming circuits, and such DC-DC converters may toggle between an active or operational mode, and a low power or standby mode. During such transitions, aspects and performance characteristics of components such as the voltage trimming circuits may affect the ability of the DC-DC converter to effectively transition from one mode to another. For example, the voltage trimming circuit may have a large initial current draw and may take a long time for RC stabilization to occur. Accordingly, the voltage trimming circuit may require a relatively long time to generate a stable output voltage that enables the transition from a low power mode to an operational mode. Such voltage trimming circuits with long RC stabilization delays may cause an overshoot in the initial output voltage which may also consume excess power, and cause damage to downstream components due to both of these reasons. Moreover, the time required for the voltage trimming circuit to stabilize may add untenable delay to the operation of the electronic device as temporal requirements of memory devices become faster and faster.

Disclosed herein are systems, methods, and devices for providing DC-DC converters that are able to quickly and efficiently transition between operational modes without the aforementioned deleterious effects. According to some embodiments, a feedback regulation loop is included in DC-DC converters that provides an alternative and independent voltage regulation loop for charge pumps included in DC-DC converters. The feedback regulation loop may include a comparator and a feedback capacitor, and may be implemented with a switch such that upon a transition from an operational mode to a low power mode, the operational feedback voltage is sampled and stored in the feedback capacitor, and such a feedback capacitor voltage may follow the DC-DC converter's output changes. During a transition from the low power mode to the operational mode, the feedback capacitor may be coupled in such a manner that the stored voltage is provided to the charge pump and is used to transition the charge pump to the operational mode while the voltage trimming circuit is still stabilizing. In this way, the charge pump is able to transition to the operational state with a significant reduction in delay, and any overshoot that may have been caused by the voltage trimming circuit is avoided.

In some embodiments, the active feedback voltage is sampled at the feedback capacitor relative to the DC-DC converter's voltage. Accordingly, once this voltage is sampled at the feedback capacitor, the sampled voltage will follow the voltage changes of the output of the DC-DC converter. Following the DC-DC converter's voltage changes at the feedback node allows the feedback regulation loop, upon wake up or transition to an operational mode, to instantly maintain a valid regulation loop that allows the DC-DC converter to recover whatever voltage drop it might experience during standby. When going to standby, or a low power mode, the DC-DC converter's output is float and will eventually drop as a result of leakage. In various embodiments, the differential voltage sampled at the feedback capacitor is configured not to drop, or to drop insignificantly relative to the DC-DC converter's output.

In some embodiments, the leakage on the DC-DC converter's output is a result of many devices connected to it that may draw some amount of current that typically grows in high temperatures. Accordingly, the DC-DC converter may refresh its output, as well as the feedback capacitor's sampled voltage during a refresh process, more frequently. The refresh time is also reduced due to the fast wakeup enabled by the regulated feedback loop which is supported by the feedback capacitor's sampled voltage. As will be discussed in greater detail below, a feedback node may be discharged to ground (GND) along with all of the internal nodes of a diode-stack included in a voltage trimming circuit while a feedback capacitor included in an feedback regulation loop follows the output of the charge pump included in the DC-DC converter such that it is continuously aligned and is alternative current (AC) coupled to the output voltage and any voltage loss that might occur. The voltage loss may be a result of output leakage in a long standby state and, as will be discussed in greater detail below, embodiments disclosed herein provide fast recovery from a relatively high voltage loss. Moreover, the feedback capacitor included in the feedback regulation loop stays always ready for an upcoming Standby-to-Active event, such as a transition from a low power mode to an operational mode, and enables an instant wakeup of the DC-DC converter.

FIG. 1 illustrates an example of a DC-DC converter, configured in accordance with some embodiments. As discussed above, and as will be discussed in greater detail below, DC-DC converters as disclosed herein, such as DC-DC converter 100, may be utilized in conjunction with analog voltage regulators, such as charge pump 101, to provide voltages and power to various components of a memory device, such as a NOR-Flash memory device. While various embodiments disclosed herein describe charge pump 101, it will be appreciated that embodiments disclosed herein may be implemented with any analog voltage regulator. As will be discussed in greater detail below, in various embodiments, DC-DC converter 100 is configured to have a feedback regulation loop that bypasses a slow wakeup stabilization by maintaining a voltage on an alternative feedback pathway that includes a feedback capacitor, which stores a voltage that was sampled just before entering the standby mode. In this way, DC-DC converters disclosed herein provide fast wake up times and transitions between modes, and prevent other undesired performance characteristics, such as overshot.

Accordingly, as discussed above, DC-DC converter 100 includes voltage trimming circuit 102. In various embodiments, voltage trimming circuit 102 is a voltage trimming diode stack that is configured to generate a feedback voltage based on an input signal received from another component, such as level shifter 104. The feedback voltage may be configured and determined based on a number of diodes included in the diode stack of voltage trimming circuit 102, as well as a reference voltage ($V_{REF}$) and a bias voltage ($V_{BIAS}$). As will be discussed in greater detail below, DC-DC converter 100, as well as its various components such as voltage trimming circuit 102, may be operational in various different power modes, such as a low power mode and an operational mode. Accordingly, the low power mode may be a standby mode in which comparator 106, discussed in greater detail below, is turned "off", the diode stack of voltage trimming circuit 102 is uncoupled from the output of charge pump 101, and the internal nodes of voltage trimming circuit 102 are discharged to an electrical circuit ground (GND). In this way, there is a low standby current since components with high current consumption are disabled. In an operational mode, comparator 106 is turned "on", the diode stack of voltage trimming circuit 102 is coupled to the output of charge pump 101.

As will be discussed in greater detail below, when voltage trimming circuit 102 is discharged when transitioning to a low power mode, the discharge occurs very quickly. However, when there is a transition to an operational mode, also referred to herein as an active mode, the stabilization of the voltage trimming circuit may be relatively slow, and feedback node 107 may take a significant amount of time to reach its target voltage. In some embodiments, this may be due to high equivalent RC network limiting the stabilization of voltage trimming circuit 102 towards its final operational voltage.

Accordingly, DC-DC converter 100 may include a feedback regulation loop that is configured to maintain a feedback voltage during a low power mode, also referred to herein as a standby mode. This maintained feedback voltage on the feedback capacitor's ports may be used to provide an appropriate feedback voltage for the feedback regulation loop, as may be utilized by charge pump 101 during a wake-up transition such as a transition from a low power mode to an operational mode. Such a feedback voltage may be used while the components of voltage trimming circuit 102 stabilize, thus enabling an almost instant wake-up and transition to an operational mode.

As similarly noted above, the voltage is maintained during a standby or low power mode, and such a voltage may be a dynamic feedback voltage which dynamically follows the output voltage of DC-DC converter 100. During the low power mode, the output of DC-DC converter 100 is floating, and a differential voltage is maintained on the feedback capacitor's ports as a sampled voltage relative to the output voltage of DC-DC converter 100. Accordingly, a node voltage of feedback capacitor 110 at a node, such as feedback capacitor node 111, may be maintained during a low power mode. More specifically, the node voltage has an initial sampled voltage value, and maintains that voltage value in a manner that corresponds to and follows changes that occur with the output of DC-DC converter 100, and more specifically, the output of charge pump 101. In this way, the node voltage at feedback capacitor node 111 is a dynamic feedback voltage that is AC coupled to the output of charge pump 101, and follows voltage changes that occur at the output. Moreover, the differential voltage value across feedback capacitor 110 is considered constant. In various embodiments, there may be other capacitances at feedback capacitor node 111 (parasitic or intentional), and the differential voltage on feedback capacitor 110 may change in reverse proportion to the capacitance ratio of feedback capacitor 110 relative to the other feedback capacitors that may be implemented in systems and devices that include DC-DC converter 100, but are not coupled to the output of DC-DC converter 100. In an example where there is are no additional capacitances at feedback capacitor node 111, the voltage at feedback capacitor node 111 will follows the voltage of DC-DC converter 100 exactly.

In various embodiments, during the low power mode, all other components are off. In various embodiments, during a standby or low power mode, an active feedback voltage is sampled relative to the DC-DC converter's output voltage, and the feedback capacitor node voltage is maintained relative to the output voltage of DC-DC converter 100. In a wakeup mode or a transition from a lower power mode to an operational mode, the feedback capacitor's sampled voltage is used to support a feedback regulation loop of DC-DC converter 100, and that is used to temporarily replace the voltage-trimming circuit while it stabilizes and becomes ready.

In various embodiments, the feedback regulation loop may include comparator 106 as well as feedback capacitor 110, which may be coupled to charge pump 101. According to some embodiments, comparator 106 is configured to have an output coupled to an input of charge pump 101, and is further configured to have input terminals coupled with feedback capacitor node 111 of feedback capacitor 110 and reference voltage $V_{REF}$. As shown in FIG. 1, a negative input terminal of comparator 106 is coupled to feedback capacitor node 111, and a positive terminal is coupled to $V_{REF}$. Comparator 106 is also coupled to an enable/disable signal which may toggle the enabling and disabling of comparator 106. As shown in FIG. 1, the enable/signal is received from inverter 116, which receives a control signal, such as a "pause" or "sleep" signal generated by a control block, discussed in greater detail below.

In various embodiments, DC-DC converter 100 further includes a switch, such as switch 112 which has an input coupled to feedback node 107, and has an output coupled to feedback capacitor node 111 as well as an input of comparator 106. Switch 112 may also have a control input that is coupled to the control signal described above, and may be received via a delay circuit, such as delay circuit 114. In various embodiments, delay circuit 114 is configured based on one or more characteristics of voltage trimming circuit 102, such as a designated amount of time required by voltage trimming circuit 102 to stabilize. Accordingly, switch 112 is configured to selectively separate and isolate feedback node 107 of the diode stack of voltage trimming circuit 102, from the rest of the feedback regulation loop. Once disabled, switch 112 uncouples comparator 106 and feedback capacitor 110 from feedback node 107. When enabled, switch 112 may re-establish such coupling.

Accordingly, during a transition from an operational mode to a low power mode, the active voltage of voltage trimming circuit 102 at feedback node 107 is sampled and held by feedback capacitor 110, and feedback capacitor 110 is configured to maintain or retain, also described herein as holding, such voltage with sufficient accuracy and minimal leakage to enable an instant wake-up on a subsequent transition back to the operational mode. More specifically, during a transition from a low power mode to an operational mode, feedback capacitor 110 holds the sampled voltage, and is configured to provide an alternative and independent voltage regulation-loop for charge pump 101 while the disconnected voltage trimming circuit 102 is in the process of stabilization. In this way, the feedback regulation loop provided by feedback capacitor 110 increases the speed of the feedback provided to charge pump 101, and reduces a lagging-feedback related output ripple of charge pump 101. It will be appreciated that such a feedback regulation loop may also be provided during an active or operational mode, where the feedback capacitor is coupled with the voltage trimming circuit. In this way, a feedback capacitor may be used to reduce ripple in an operational mode, and the implementation with a switch further enables fast transitions between modes, such as a wakeup transition, not hindered by the stabilization time of the voltage trimming circuit.

Moreover, during a transition from an operational mode to a low power mode, switch 112 is configured to sample the voltage drop across voltage trimming circuit 102 and hold that voltage in feedback capacitor 110 before voltage trimming circuit 102 is discharged to GND. Switch 112 is able to hold this voltage on feedback capacitor 110 until the next wake-up transition that includes a transition from a lower power mode to operational mode. As discussed above and as will be discussed in greater detail below, during a transition from a low power mode to an operational mode, switch 112 continues to hold the sampled voltage at feedback capacitor 110 and separates the stabilizing voltage trimming circuit 102 from the regulation loop during the stabilization of voltage trimming circuit 102. After stabilization is achieved, the two nodes isolated by switch 112, feedback node 107 and feedback capacitor node 111, are assumed to be equalized, and switch 112 can safely couple these two nodes.

While various embodiments disclosed herein make reference to DC-DC converters, it will be appreciated that the concepts described above may be implemented with other types of converters as well. For example, embodiments disclosed herein may be implemented with different types of voltage converters and power converters, and may be used to provide feedback regulation loops for such voltage converters and power converters. Moreover, embodiments disclosed herein may be implemented to provide such feedback regulation loops for various components other than a charge pump.

Figure 2:
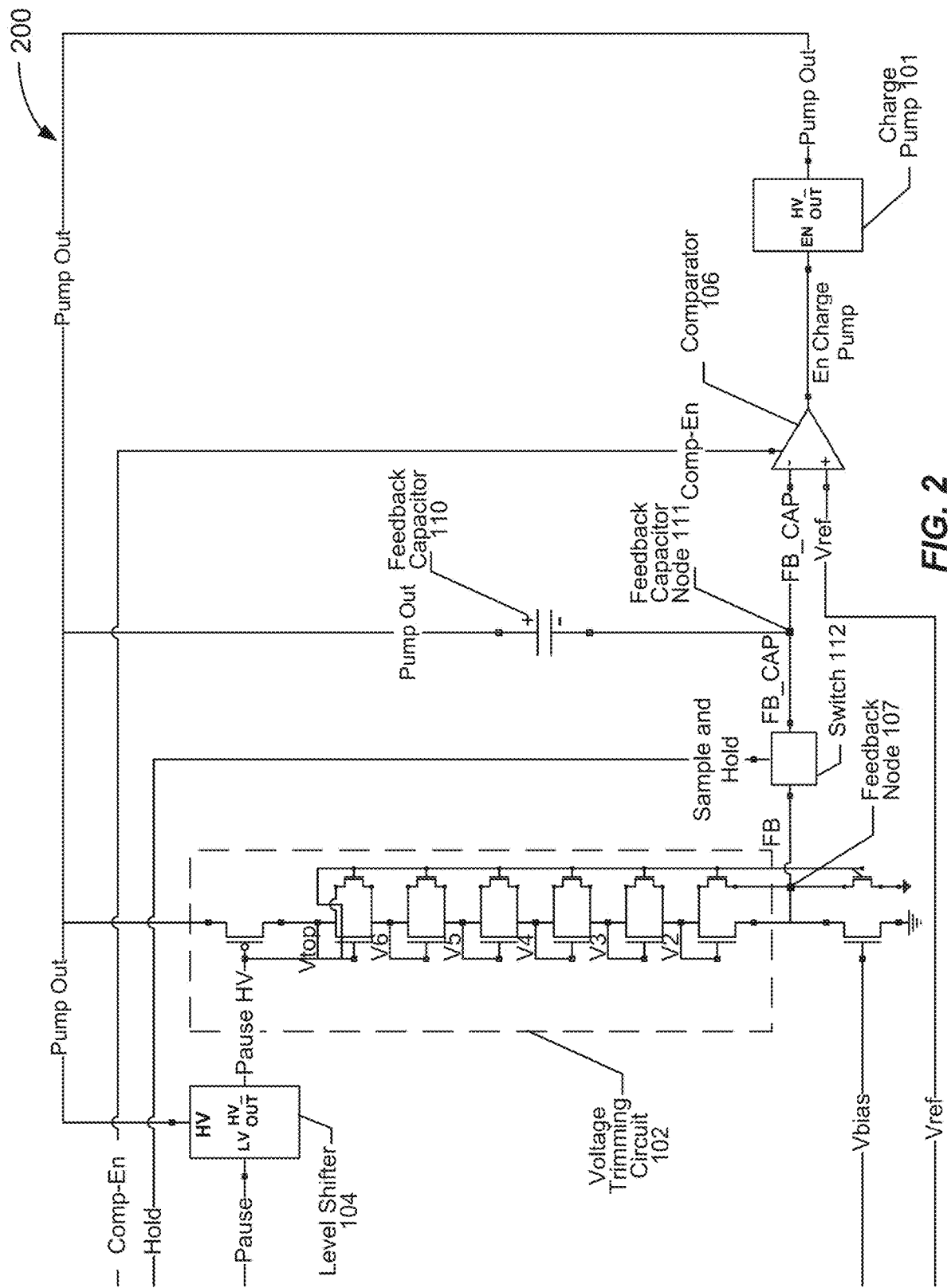
FIG. 2 illustrates another example of a DC-DC converter, configured in accordance with some embodiments.

FIG. 2 illustrates another example of a DC-DC converter, configured in accordance with some embodiments. More specifically, FIG. 2 illustrates a configuration of DC-DC converter 200, as discussed above with reference to FIG. 1, that may utilize additional control signals, but fewer components. Accordingly, as discussed above, DC-DC converter 200 includes charge pump 101, voltage trimming circuit 102, level shifter 104, comparator 106, feedback node 107, feedback capacitor 110, feedback capacitor node 111, and switch 112. As shown in FIG. 2, additional control signals such as a "sample and hold" signal and a "comparator enable" signal are generated and provided to components such as switch 112 as well as comparator 106. Moreover, components such as a delay circuit and an inverter are not included as their functionalities are implemented via the generation of the additional control signals by another system component, such as a control block. In this way, the processing logic and circuitry utilized to implement DC-DC converter 200 may be reduced.

Figure 3:
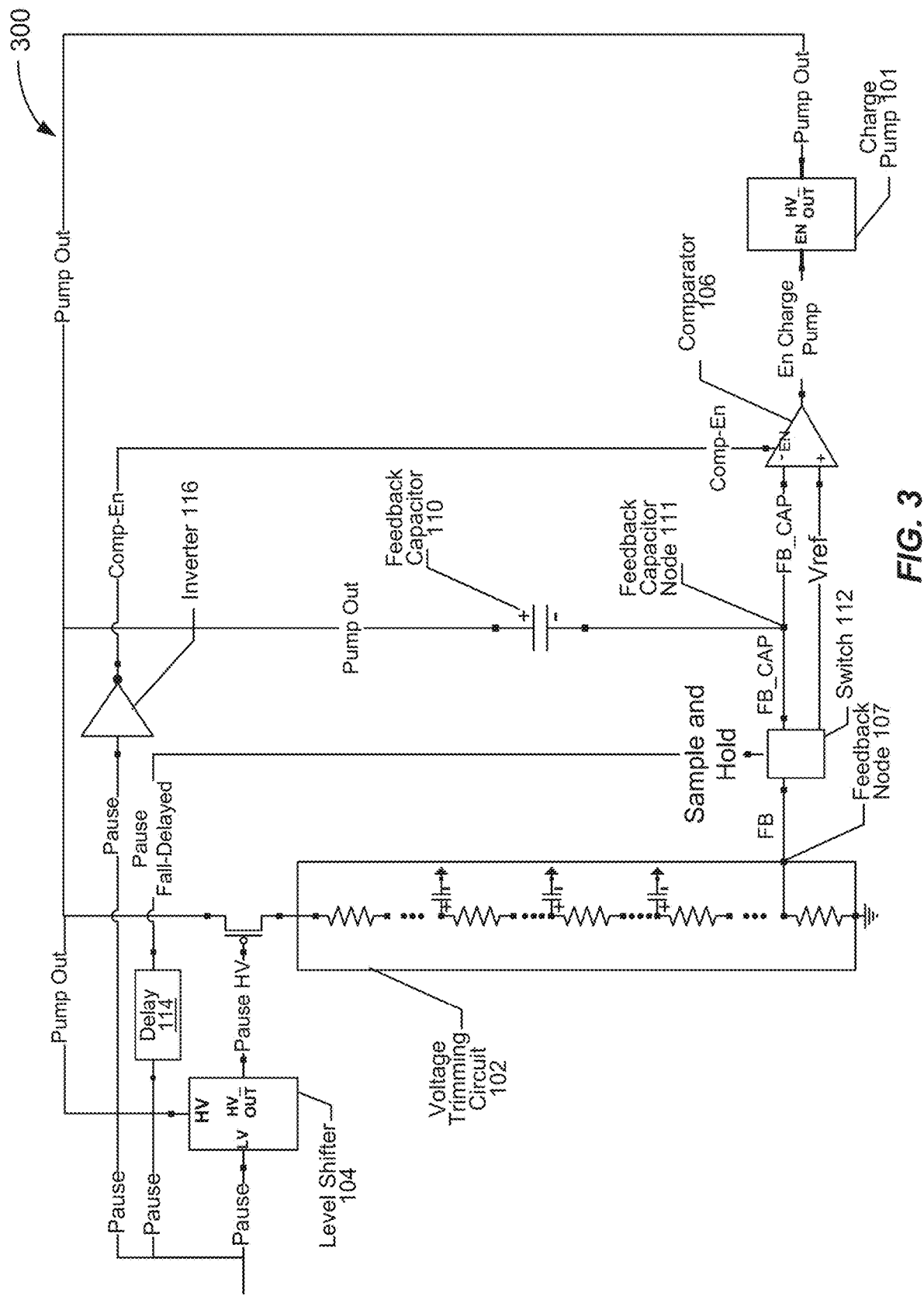
FIG. 3 illustrates yet another example of a DC-DC converter, configured in accordance with some embodiments.

FIG. 3 illustrates yet another example of a DC-DC converter, configured in accordance with some embodiments. FIG. 3 illustrates a configuration of DC-DC converter 300, as discussed above with reference to FIG. 2, that includes charge pump 101, voltage trimming circuit 102, level shifter 104, comparator 106, feedback node 107, feedback capacitor 110, feedback capacitor node 111, and switch 112. As shown in FIG. 3, additional configurations and implementations of voltage trimming circuit 102 are disclosed herein. More specifically, while some embodiments describe voltage trimming circuit 102 as including a diode stack, FIG. 3 illustrates that any suitable resistive element may be used in voltage trimming circuit 102. Accordingly, as shown in FIG. 3, multiple resistive elements may be coupled in series to generate the previously described trimming voltages.

Figure 4:
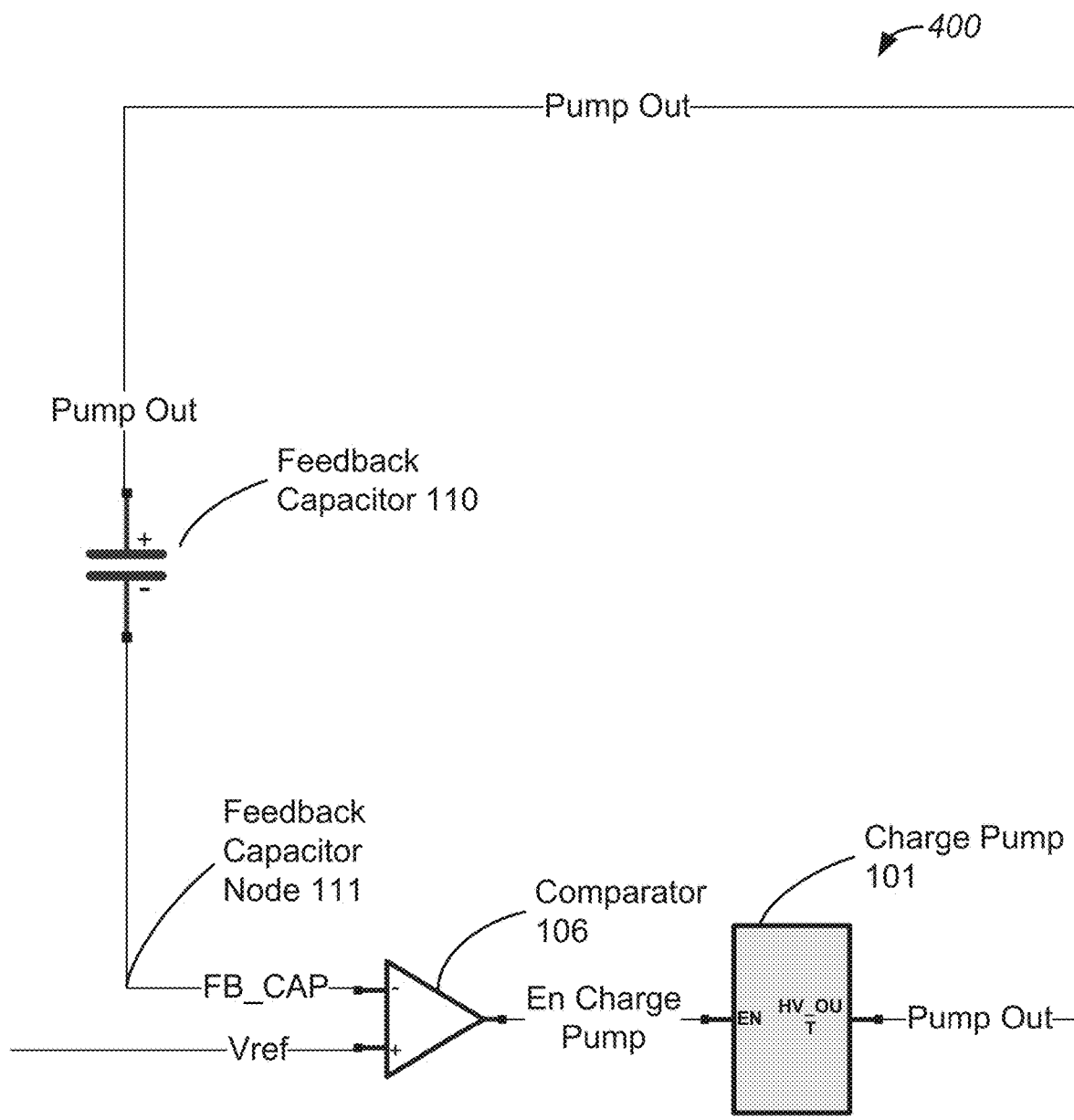
FIG. 4 illustrates an example of a DC-DC converter feedback regulation loop, configured in accordance with some embodiments.

FIG. 4 illustrates an example of a DC-DC converter feedback regulation loop, configured in accordance with some embodiments. As discussed above with reference to FIGS. 1-3, a DC-DC converter may include a feedback regulation loop that is configured to provide an alternative feedback pathway for charge pump 101 while a voltage trimming circuit (not shown) is the process of stabilization. In various embodiments, the feedback regulation loop may be referred to as an alternative feedback pathway herein because it provides an additional or alternate feedback pathway for the charge pump that is different from other feedback pathways that might exist, such as a feedback pathway through a voltage trimming circuit when such a circuit is coupled to the charge pump. For clarity purposes, FIG. 4 provides an additional diagram of feedback regulation loop 400 that includes feedback capacitor 110, comparator 106, as well as charge pump 101. Additional timing characteristics of such components and control signals will be discussed in greater detail below with reference to FIGS. 5A, 5B, 6A, and 6B.

Figure 5A:
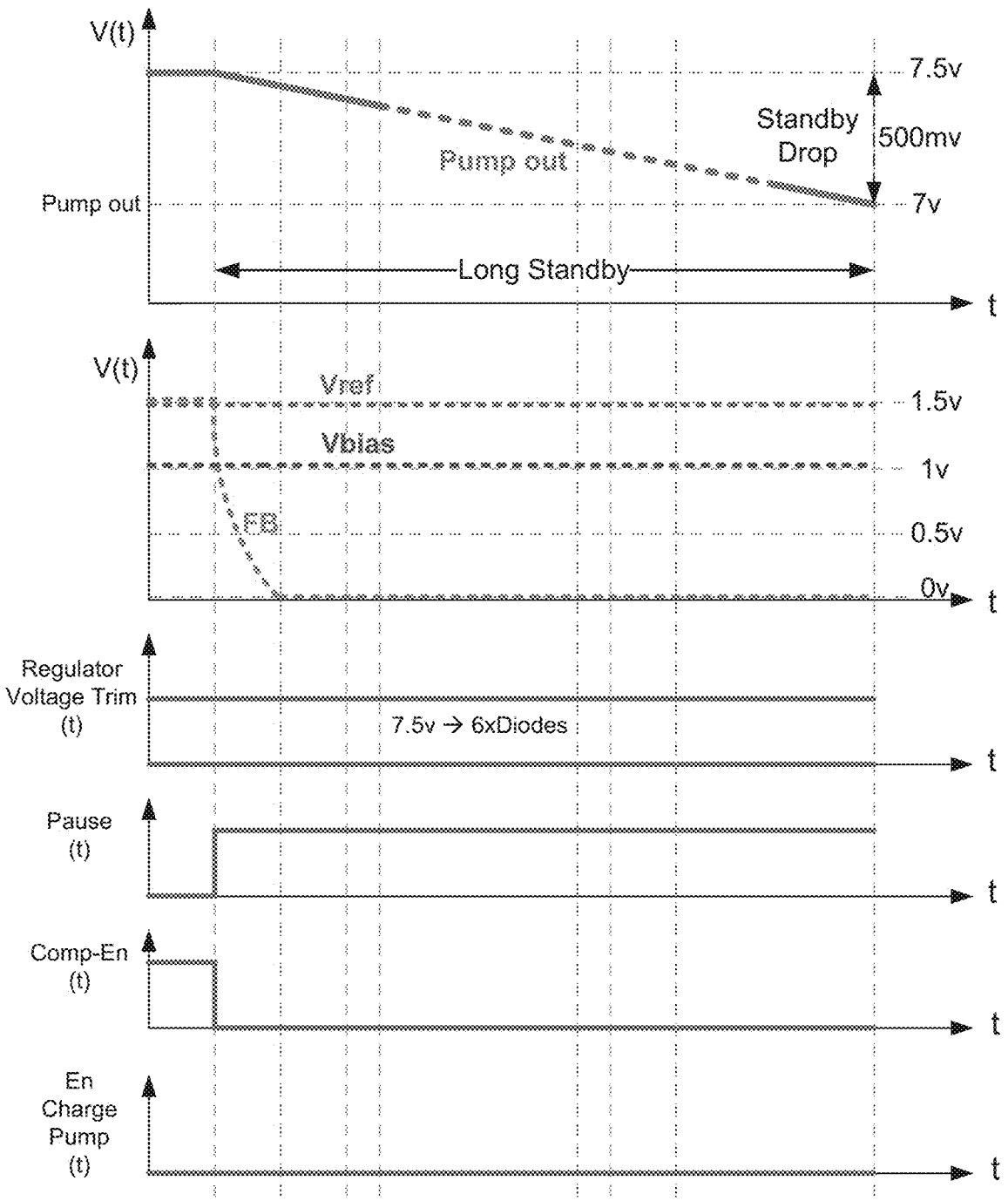
FIG. 5A illustrates an example of a timing diagram of a transition from an operational mode to a low power mode and where a feedback loop is disabled.

FIG. 5A illustrates an example of a timing diagram of a transition from an operational mode to a low power mode and where a feedback loop is disabled. FIG. 5A illustrates various voltage levels as they relate to signals discussed above with reference to FIGS. 1-4. For example, a "Pause" signal may be a stand-by signal, a "Comp-En" signal may enable/disable the comparator, and an "En Charge Pump" signal may provide an input to the charge pump thus enabling it. As shown in timing diagram 500, when a "pause" signal or a stand-by signal is activated and goes high, a transition from the operational mode to a low power mode may be initiated. Accordingly, as shown in timing diagram 500, a voltage at an output of the charge pump (identified as "Pump out") may drop off during the low power mode, and a voltage at a feedback node (identified as FB) may drop to 0V as the voltage trimming circuit discharges quickly. In this example, there is no feedback regulation loop that maintains a valid feedback voltage relative to an output voltage of the charge pump, so the voltage seen by a comparator, such as comparator 106 discussed above, may be 0V. Moreover, the comparator may be disabled when the DC-DC converter enters the low power mode.

Figure 5B:
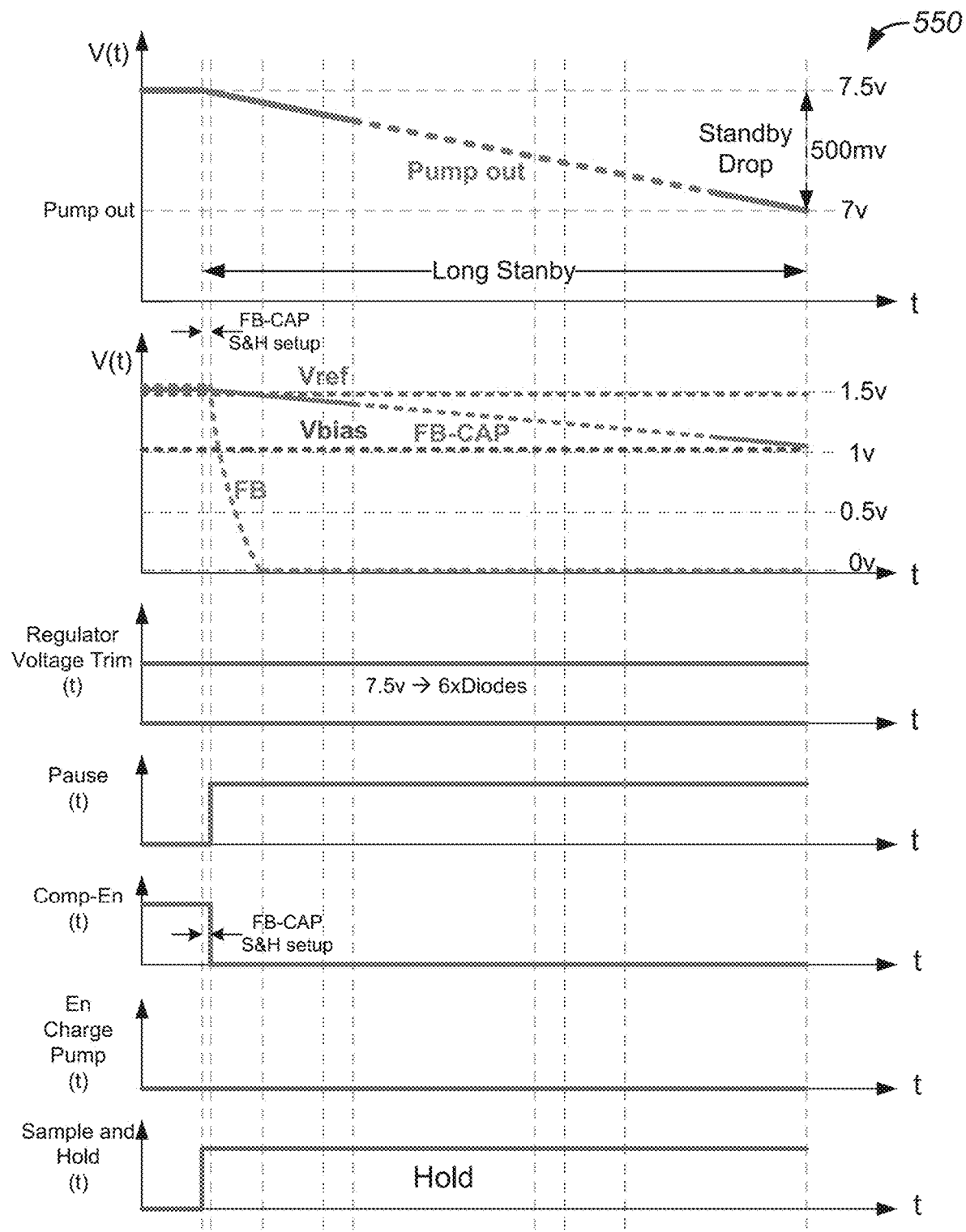
FIG. 5B illustrates an example of a timing diagram of a transition from an operational mode to a low power mode where the DC-DC converter includes a feedback regulation loop, implemented in accordance with some embodiments.

FIG. 5B illustrates an example of a timing diagram of a transition from an operational mode to a low power mode where the DC-DC converter includes a feedback regulation loop, implemented in accordance with some embodiments. FIG. 5B also illustrates various voltage levels as they relate to signals discussed above with reference to FIGS. 1-4. In various embodiments, a "Pause" signal may be a stand-by signal, a "Comp-En" signal may enable/disable the comparator, and an "En Charge Pump" signal may provide an input to the charge pump thus enabling it. There may also be a "sample and hold" signal that controls the operation of a sample and hold switch, such as switch 112. Such signals may be generated by an appropriate processing block of a system or device such as a nonvolatile memory. As similarly discussed above, and as shown in timing diagram 550, when a "pause" signal or a stand-by signal is activated and goes high, a transition from the operational mode to a low power mode may be initiated. As similarly discussed above, as shown in timing diagram 550, a voltage at an output of the charge pump (identified as "Pump out") may drop off during the low power mode, and a voltage at a feedback node (identified as FB) may drop to 0V as the voltage trimming circuit discharges.

However, in this example, a feedback regulation loop is implemented such that a differential voltage is sampled prior to the time of the transition, and such output voltage is held at a node of the feedback capacitor (identified as FB-CAP). Accordingly, the voltage seen by the comparator that is implemented before the charge pump is the voltage at the feedback capacitor node. In this way, when a subsequent transition to an operational mode occurs, the voltage maintained at the feedback capacitor node may be utilized to maintain the feedback regulation loop during wakeup and while the voltage trimming circuit stabilizes.

Figure 6A:
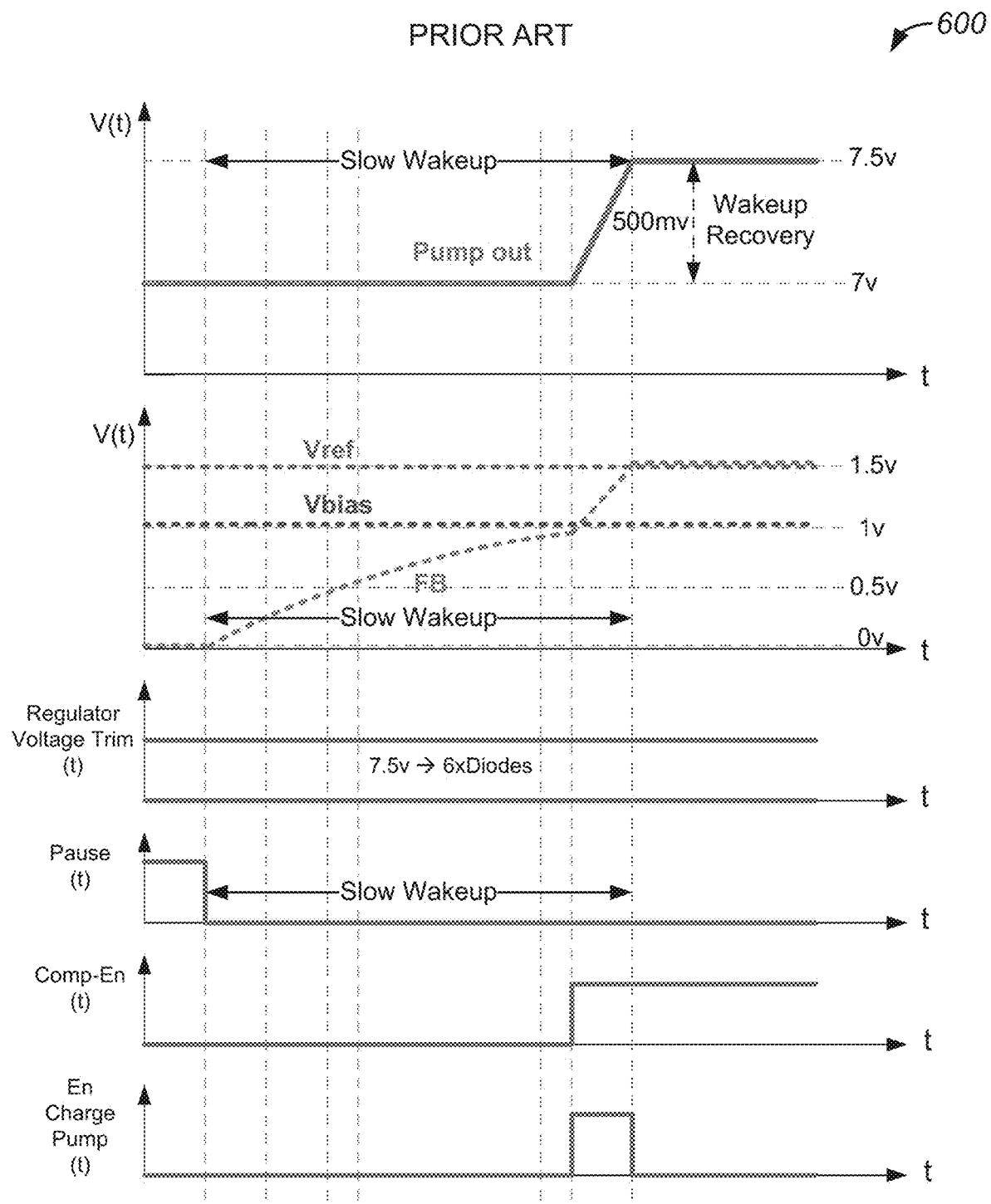
FIG. 6A illustrates an example of a timing diagram of a transition from a low power mode to an operational mode.

FIG. 6A illustrates an example of a timing diagram of a transition from a low power mode to an operational mode, implemented in accordance with some embodiments. As noted above, FIG. 6A illustrates a "Pause" signal that may be a stand-by signal, a "Comp-En" signal that may enable/disable the comparator, and an "En Charge Pump" signal that may provide an input to the charge pump thus enabling it. As shown in timing diagram 600, the "pause" signal may go low, and initiate the transition from a low power mode to an operational mode. Accordingly, the voltage trimming circuit may be powered, and may slowly charge and build voltage at a feedback node (identified as FB). More specifically, the slow charging of the feedback node occurs during the stabilization process, and subsequently, the charge pump is provided with sufficient voltage to wake up and transition to the operational mode. Accordingly, the wakeup recovery of the charge pump occurs after the wake up and stabilization of the voltage trimming circuit.

Figure 6B:
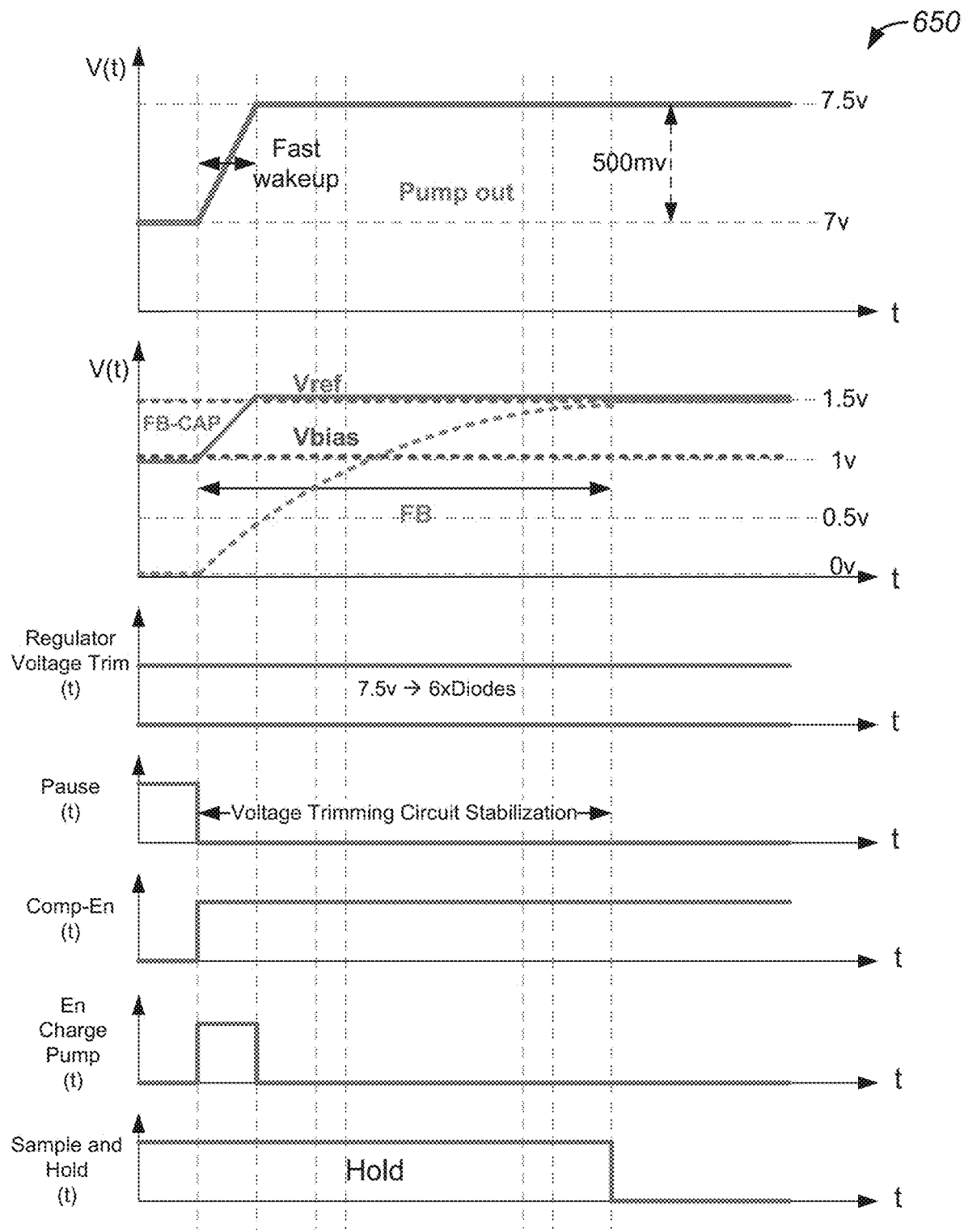
FIG. 6B illustrates an example of a timing diagram of a transition from a low power mode to an operational mode where the DC-DC converter includes a feedback regulation loop, implemented in accordance with some embodiments.

FIG. 6B illustrates an example of a timing diagram of a transition from a low power mode to an operational mode where the DC-DC converter includes a feedback regulation loop, implemented in accordance with some embodiments. As similarly discussed above, FIG. 6B illustrates various voltage levels as they relate to signals discussed above with reference to FIGS. 1-4. For example, a "Pause" signal may be a stand-by signal, a "Comp-En" signal may enable/disable the comparator, an "En Charge Pump" signal may provide an input to the charge pump thus enabling it, and a "sample and hold" signal may control the operation of a sample and hold switch, such as switch 112. Such signals may be generated by an appropriate processing block of a system or device such as a nonvolatile memory. As similarly discussed above, and as shown in timing diagram 650, the "pause" signal may go low, and initiate the transition from a low power mode to an operational mode. As discussed above, the voltage trimming circuit may be powered, and may slowly charge and build voltage at a feedback node (identified as FB).

However, in this example, a sampled voltage (identified as FB-CAP) has been maintained by the feedback capacitor included in the feedback regulation loop, and that voltage is made available to the comparator and the downstream charge pump. Accordingly, the voltage utilized by the charge pump to wake up is made available much earlier and without the wake up/stabilization delay of the voltage trimming circuit. In this way, the speed at which the transition from the low power mode to the operational mode is implemented is greatly increased. Moreover, other operational characteristics, such as an overshoot, are reduced due to the isolation of the voltage trimming circuit during stabilization.

Figure 7:
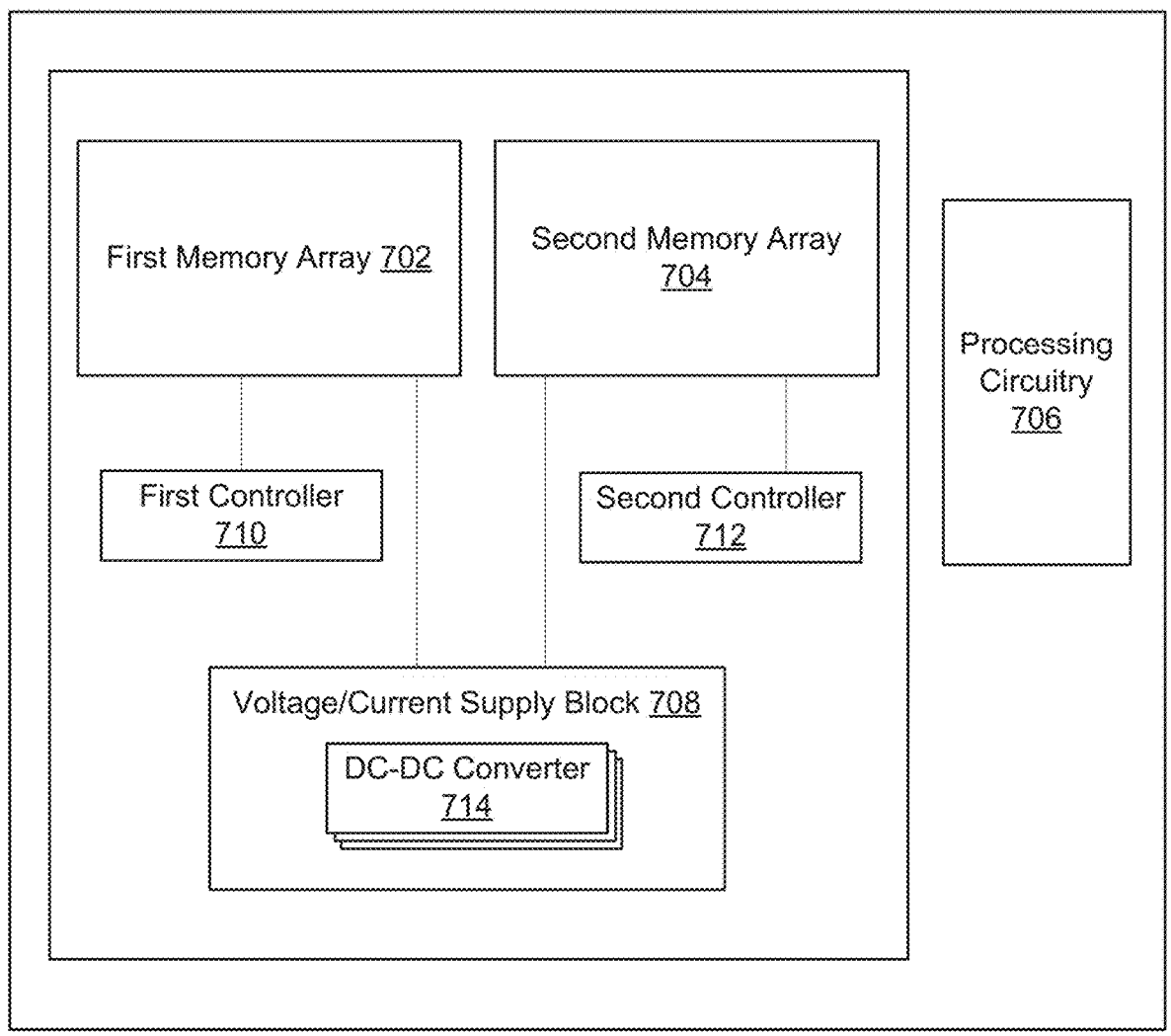
FIG. 7 illustrates a nonvolatile memory that includes a DC-DC converter, configured in accordance with some embodiments.

FIG. 7 illustrates a nonvolatile memory that includes a DC-DC converter, configured in accordance with some embodiments. As discussed above, a DC-DC converter, such as DC-DC converter 100, and a charge pump, such as charge pump 101, may be included in a nonvolatile memory, such as nonvolatile memory 700, which may be a flash memory. In some embodiments, nonvolatile memory 700 is a NOR flash memory that is configured to include one or more nonvolatile memory arrays.

For example, nonvolatile memory 700 includes various memory arrays, such as first memory array 702 and second memory array 704 which may each include arrays of nonvolatile memory cells. In this example, first memory array 702 and second memory array 704 may be implemented as different memory banks that each have their own respective controls provided by processing circuitry 706. In some embodiments, nonvolatile memory 700 further includes first controller 710 and second controller 712 which are each configured to provide support for read operations as well as program and erase operations for each of first memory array 702 and second memory array 704 respectively.

In various embodiments, nonvolatile memory 700 further includes voltage/current supply block 708 that is a multi-purpose mixed-signal block configured to provide nonvolatile memory 700 with a range of voltages, currents, and digital signals/indicators that are utilized for the different modes of operation discussed above. Accordingly, voltage/current supply block 708 includes numerous different block types, such as DC-DC converters (such as charge-pumps and boosters supporting voltage range of +10V to −9V), voltage regulators (supplying high resolution analog voltages in the range of +10V to 0v), regulated current sources, and low-resolution temperature detection. Thus, voltage/current supply block 708 includes DC-DC converter 714 which may be any of the DC-DC converters disclosed herein, such as DC-DC converter 100, DC-DC converter 200, and DC-DC converter 300. In this way, charge pumps, such as charge pump 101 discussed above, may be included in voltage/current supply block 708 of nonvolatile memory 700.

It will be appreciated that components of nonvolatile memory 700 may be implemented on a same chip, or on different chips. For example, first memory array 702, second memory array 704, and voltage/current supply block 708 may be implemented on a first chip, while the processing circuitry 706 is implemented on a second chip. In another example, first memory array 702, second memory array 704, voltage/current supply block 708, and processing circuitry 706 may be implemented on the same chip.

Figure 8:
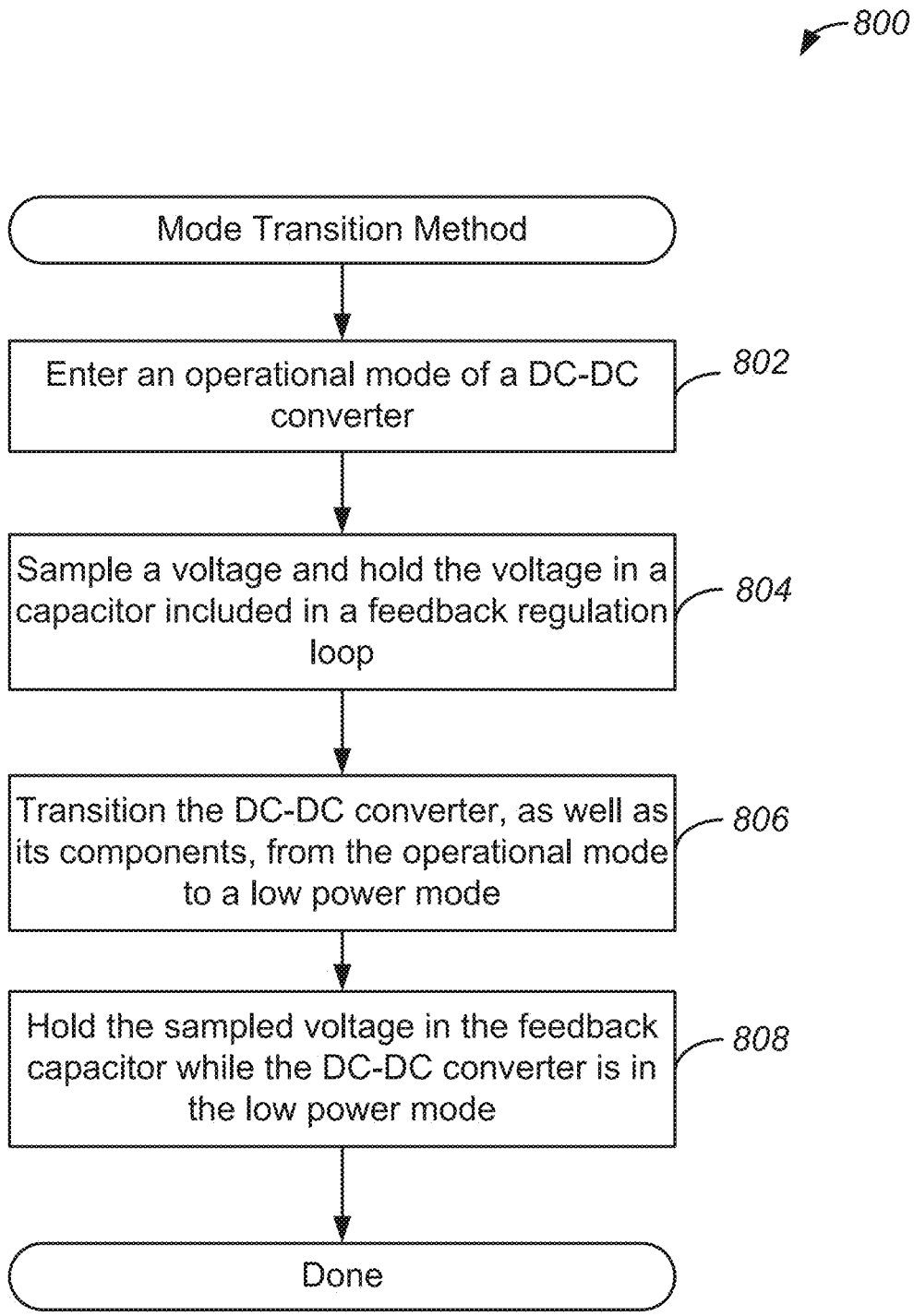
FIG. 8 illustrates a flow chart of a DC-DC converter mode transition method, implemented in accordance with some embodiments.

FIG. 8 illustrates a flow chart of a DC-DC converter mode transition method, implemented in accordance with some embodiments. As discussed above, DC-DC converters are configured to have feedback regulation loops that bypass a slow wakeup stabilization by maintaining a sampled voltage at a feedback capacitor in the feedback regulation loop. As will be discussed in greater detail below, methods are disclosed herein for utilizing such feedback regulation loops to sample and hold voltages during a low power or standby mode, thus enabling fast wakeup times when a subsequent transition back to an operational mode is implemented.

Method 800 may commence with operation 802 during which an operational mode may be entered. Accordingly, a DC-DC converter may be operating in an active or operational mode, and all components of the DC-DC converter may be powered. Such an operational mode may be utilized when functioning as part of a voltage/current supply block, as noted above, and such a DC-DC converter is used to provide power signals to other components of such systems and devices discussed above.

Method 800 may commence with operation 804 during which a voltage may be sampled and held at a feedback capacitor included in a feedback regulation loop. As similarly discussed above, such sampling may occur when there is an indication that a transition of modes is to be implemented. Moreover, such sampling may occur by virtue of a switch coupling the voltage trimming circuit of the DC-DC converter to a node of the feedback capacitor included in the feedback regulation loop. When coupled in this manner, the feedback capacitor has a first node coupled to an output of the charge pump, and has a second node coupled to the voltage trimming circuit, and the feedback capacitor stores a voltage equivalent to a difference between the two. Moreover, right after the sampling, the feedback capacitor holds the second node at the sampled voltage of the voltage trimming circuit relative to the DC-DC converter's output. In various embodiments, this sampled voltage will follow any voltage change that might occur on the DC-DC converter's output during the standby or low power mode. It will be appreciated that the voltage trimming circuit would also follow voltage changes in the DC-DC converter's output if it were active. In this way, the feedback capacitor samples and holds a voltage in a manner that simulates the behavior of an active voltage trimming circuit with regard to following the DC-DC converter's voltage changes, even when the voltage trimming circuit is actually powered down in a low power mode.

Method 800 may proceed to operation 806 during which the DC-DC converter may transition from an operational mode to a low power mode. As similarly discussed above, one or more control signals may indicate that a transition from an operational mode to a low power mode is to be implemented. For example, a pause or enable signal may indicate that a transition from an operational mode to a low power mode is desired. Accordingly, the switch may uncouple the voltage trimming circuit, and a low power mode may be entered subsequent to the sampling described above.

Method 800 may proceed to operation 808 during which the sampled voltage may be held by the feedback capacitor in the feedback regulation loop during the second state. Thus, during the low power mode, the feedback capacitor may continue to hold the second node to the sampled voltage relative to the DC-DC converter output during the low power mode. The feedback capacitor may be configured to reduce leakage and ensure that a sufficient amount of voltage is retained until a subsequent mode transition is initiated. In this way, the feedback capacitor makes available the sampled voltage to the comparator and the charge pump when such subsequent transition is initiated, and the charge pump does not have to wait for the voltage trimming circuit to stabilize.

Figure 9:
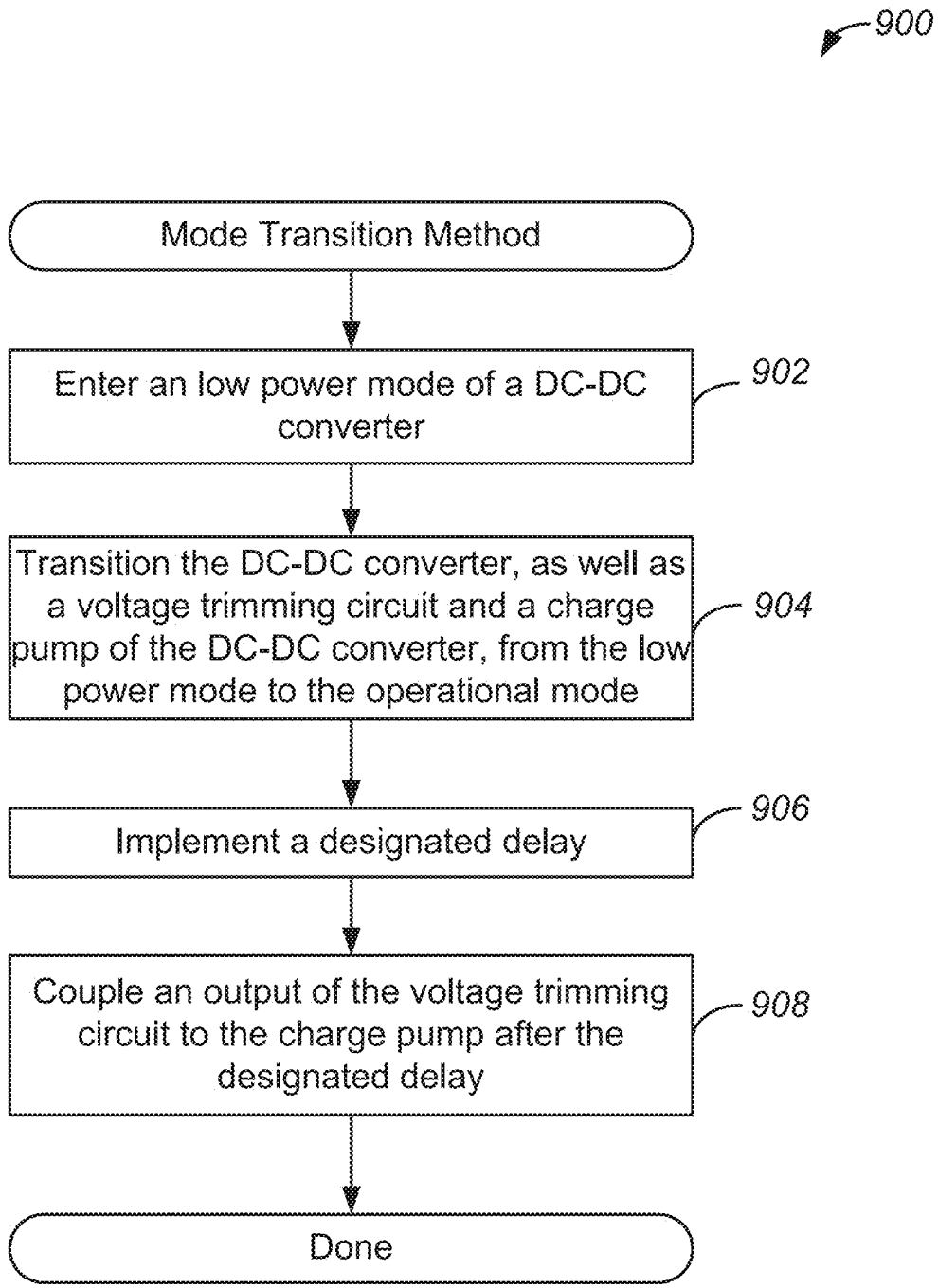
FIG. 9 illustrates a flow chart of another DC-DC converter mode transition method, implemented in accordance with some embodiments.

FIG. 9 illustrates a flow chart of another DC-DC converter mode transition method, implemented in accordance with some embodiments. As similarly discussed above, DC-DC converters are configured to have feedback regulation loops that bypass a slow wakeup stabilization by maintaining a sampled voltage at a feedback capacitor in the feedback regulation loop. Accordingly, methods are disclosed herein for utilizing such feedback regulation loops to provide fast wake up times when transitioning from a low power mode to an operational mode.

Method 900 may commence with operation 902 during which a low power mode may be entered. Accordingly, a DC-DC converter may be in a low power or standby mode, and most components of the DC-DC converter, such as a comparator and a voltage trimming circuit, may be unpowered. Such a low power mode may be utilized when functioning as part of a voltage/current supply block, as noted above, and such a DC-DC converter is used to provide power signals to other components of such systems and devices discussed above.

Method 900 may proceed to operation 904 the DC-DC converter may transition from a low power mode to an operational mode. As similarly discussed above, one or more control signals may indicate that a transition from a low power mode to an operational mode is to be implemented. For example, a pause or enable signal may indicate that a transition from low power mode to an operational mode is desired. Accordingly, various components of the DC-DC converter, such as the voltage trimming circuit and the comparator, may be powered on and resume operation.

Method 900 may proceed to operation 906 during which a delay may be implemented. Accordingly, a delay may be implemented for a designated amount of time to wait for the voltage trimming circuit to stabilize. Accordingly, during the designated delay, the DC-DC converter may wait for an output of the voltage trimming circuit to stabilize. As previously discussed, the designated delay may be determined based on one or more characteristics of the voltage trimming circuit, such as number/characteristics of the diodes included, or may be determined based on a voltage reading at an output of the voltage trimming circuit if available.

Method 900 may proceed to operation 908 during which a switch may couple the voltage trimming circuit to the charge pump. As described above, the switch may be a sample and hold switch, and may be used to couple the output of the voltage trimming circuit to a feedback capacitor node and input of a comparator. In this way, the output of the voltage trimming circuit may be coupled back to the comparator and the charge pump once the output of the voltage trimming circuit has stabilized.

Figure 10:
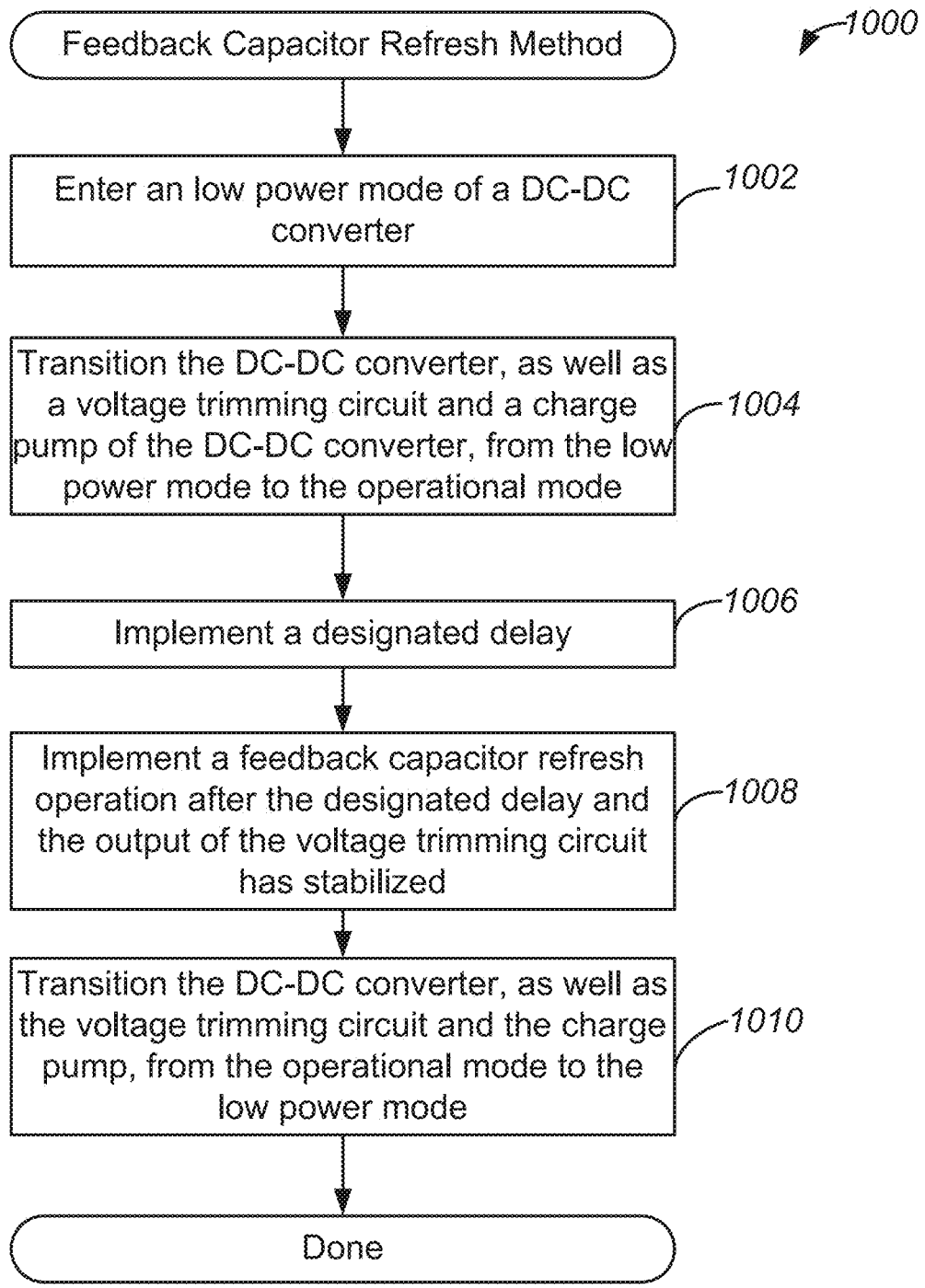
FIG. 10 illustrates a flow chart of feedback capacitor refresh method, implemented in accordance with some embodiments.

FIG. 10 illustrates a flow chart of feedback capacitor refresh method, implemented in accordance with some embodiments. Accordingly, as will be discussed in greater detail below, a feedback capacitor included in a feedback regulation loop may be periodically refreshed to ensure that a valid voltage value is maintained and available when a wakeup event occurs and systems and devices including the charge pump return to an operational mode.

Method 1000 may commence with operation 1002 a low power mode may be entered. As discussed above, a DC-DC converter may be in a low power or standby mode, and most components of the DC-DC converter, such as a comparator and a voltage trimming circuit, may be unpowered. Such a low power mode may be utilized when functioning as part of a voltage/current supply block, as noted above.

Method 1000 may proceed to operation 1004 during which the DC-DC converter may transition from a low power mode to an operational mode. As similarly discussed above, one or more control signals may be utilized to implement the mode transition. Within the context of method 1000, the transition to the operational mode may be a relatively brief and temporary transition that is implemented primarily to refresh the voltage stored in the charge pump, and not necessarily implement a wakeup of the entire device/system that includes the charge pump. In this way, the voltage trimming circuit and the charge pump may be powered up and briefly transition to an operational mode to enable such a refresh operation, and then return to the low power mode as will be discussed in greater detail below.

Method 1000 may proceed to operation 1006 during which a delay may be implemented. Accordingly, once the voltage trimming circuit and the charge pump may be powered up, a designated delay may be implemented to allow the output voltage of the voltage trimming circuit to stabilize.

Method 1000 may proceed to operation 1008 during which a refresh operation may be implemented. Accordingly, once the output voltage of the voltage trimming circuit has stabilized, the switch may couple the output of the voltage trimming circuit to a node of the feedback capacitor included in the feedback regulation loop, and the voltage may be sampled and held. In this way, the voltage at the feedback capacitor node may be refreshed to the output voltage of the voltage trimming circuit, and decay in the voltage maintained at the feedback capacitor node may be mitigated.

Method 1000 may proceed to operation 1010 during which the DC-DC converter may transition from the operational mode to the low power mode. Accordingly, as noted above, one or more control signals may indicate that a transition from an operational mode to a low power mode is to be implemented, and the voltage trimming circuit and the comparator may be powered down one again as the DC-DC converter returns to a low power mode. In various embodiments, the transition back to the low power mode may be implemented after a designated period of time. For example, the designated period of time may be configured to enable the voltage trimming circuit to stabilize, and the sample and hold operations to be implemented at the feedback capacitor. In this way, the amount of time spent in the operational mode may be configured based on an estimate of a combined time required by the output stabilization and the refresh operation described above.

Figure 11:
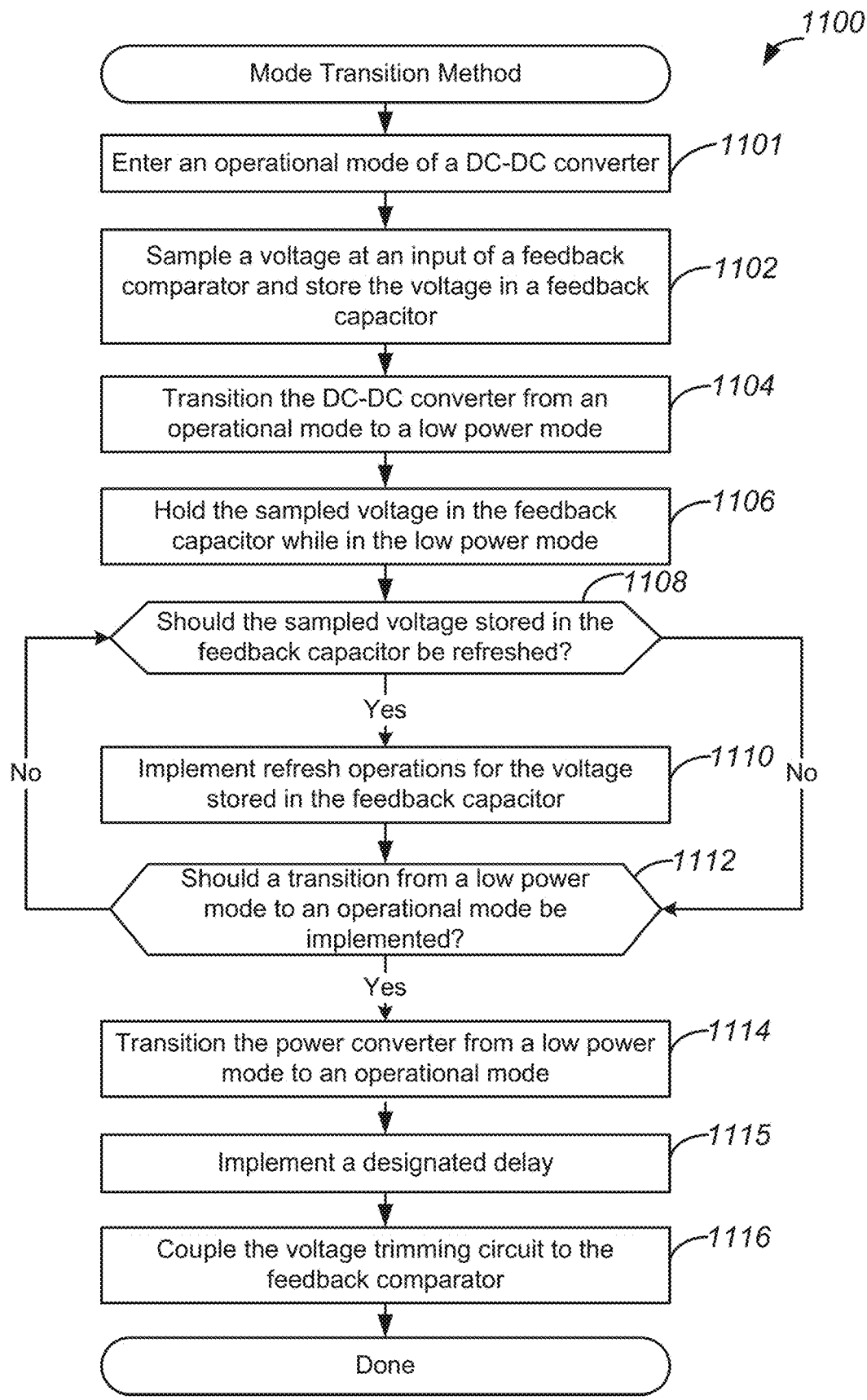
FIG. 11 illustrates a flow chart of yet another DC-DC converter mode transition method, implemented in accordance with some embodiments.

FIG. 11 illustrates a flow chart of yet another DC-DC converter mode transition method, implemented in accordance with some embodiments. As discussed above, methods are disclosed herein for utilizing such feedback regulation loops to provide fast wake up times and transitions between modes, as well as to prevent other undesired performance characteristics, such as overshot. Additional details of such methods are provided below.

Method 1100 may commence with operation 901 during which an operational mode may be entered. As similarly discussed above with reference to FIG. 8, a DC-DC converter may be operating in an active or operational mode, and all components of the DC-DC converter may be powered.

Method 1100 may proceed to operation 1102 during which a switch may couple a feedback capacitor included in a feedback regulation loop to a voltage trimming circuit of a DC-DC converter to sample and hold a voltage. Accordingly, a control signal may command the switch to couple the voltage trimming circuit with the feedback capacitor and comparator, and the feedback capacitor may sample and store a voltage determined by the output of the voltage trimming circuit and feedback node. As similarly discussed above, such sampling may occur in anticipation of a transition from a first mode, such as an operational mode, to a second mode, such as a low power mode.

Method 1100 may proceed to operation 1104 during which the DC-DC converter may transition from a first mode to a second mode, and the voltage trimming circuit may be isolated. As similarly discussed above, a control signal, such as a pause signal or an enable signal, may identify a transition event in which the DC-DC converter is to transition to a low power mode. In such a low power mode, the voltage trimming circuit is isolated and uncoupled form the feedback capacitor and comparator by the switch, and is also uncoupled from the output of the charge pump. Accordingly, a low power mode is entered in which the voltage trimming circuit is powered down and discharged to GND, and the comparator may also be disabled. The charge pump may also have reduced power consumption during such a low power mode, and its output may be left to float.

Method 1100 may proceed to operation 1106 during which the sampled voltage may be held by the feedback capacitor in the feedback regulation loop during the second state. As similarly discussed above, during the low power mode, the feedback capacitor may continue to hold the second node, also referred to as the feedback capacitor node, to the sampled voltage following the DC-DC converter's output. While the feedback capacitor is configured to reduce charge leakage, in some embodiments, some leakage may occur, and a voltage stored within the feedback capacitor may decay.

Accordingly, method 1100 may proceed to operation 1108 during which it may be determined if the sampled voltage stored in the feedback capacitor should be refreshed. Such a determination may be made based on a comparison of the feedback capacitor voltage with a designated voltage value. Thus, voltage sensors may be included at the nodes of the feedback capacitor and the measured voltage may be compared against a designated voltage value to determine if the feedback capacitor voltage should be refreshed. In some embodiments, the determination may be made based on a determination that the voltage of the feedback capacitor has decreased more than a designated amount. Accordingly, the voltage of the feedback capacitor may be measured at the transition to the low power mode, and subsequent measurements may be made and compared to that initial measurement to determine if a sufficiently large decrease has occurred. If it is determined that the feedback capacitor voltage should be refreshed, method 1100 may proceed to operation 1110. If determined that the feedback capacitor voltage should not be refreshed, method 1100 may proceed to operation 1112.

Method 1100 may proceed to operation 1110 during which the feedback capacitor voltage may be refreshed. Accordingly, during operation 1110, a refresh operation may be implemented in accordance with FIG. 10 discussed above. More specifically, the DC-DC converter may transition to an operational mode, a delay may be implemented to allow the output voltage to stabilize, the voltage may be sampled and held at the feedback capacitor, and the DC-DC converter may return back to the low power mode.

Method 1100 may proceed to operation 1112 during which it may be determined if a transition from the low power mode to an operational mode is to be implemented. As similarly discussed above, such a transition may be identified based on a control signal, such as a pause or an enable signal. If no transition is to be implemented, method 1100 may return to operation 1108. If a transition is to be implemented, method 1100 may proceed to operation 1114.

Accordingly, method 1100 may proceed to operation 1114 during which the DC-DC converter may transition to an operational mode. Accordingly, the voltage trimming circuit may be powered up, may be coupled to the output of the charge pump, and may begin to stabilize during its wakeup period. Furthermore, the comparator may also be enabled. However, during this period, the switch may keep the voltage trimming circuit isolated from the feedback capacitor and the comparator such that the charge pump is provided with a feedback voltage from the feedback regulation loop that includes the feedback capacitor. In this way, the voltage trimming circuit is provided time to stabilize its output voltage based on the input it is receiving from the charge pump, and the charge pump is quickly provided with the appropriate voltage it needs from the feedback capacitor via the comparator to transition to the operational mode.

Method 1100 may proceed to operation 915 during which a delay may be implemented. As similarly discussed above, a designated delay may be implemented to provide the voltage trimming circuit with sufficient time for its output voltage to stabilize. During this time, the switch keeps the output of the voltage trimming circuit uncoupled from the feedback capacitor node, comparator, and charge pump, as discussed above, and the feedback capacitor provides the charge pump with a valid feedback voltage.

Method 1100 may proceed to operation 1116 during which the voltage trimming circuit may be coupled with the feedback capacitor and the comparator. Accordingly, after the designated delay, the voltage trimming circuit may be coupled to the with the feedback capacitor and the comparator during the operational mode, and issues such as wake up delay and overshoot are reduced and avoided.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining a direct current (DC)-DC converter is to be transitioned from an operational mode to a low power mode;
   storing a voltage at an input of a comparator coupled to an input of a charge pump, the voltage being stored in a feedback capacitor of a feedback regulation loop;
   uncoupling a voltage trimming circuit from the input of the comparator; and
   maintaining, at least in part, the stored voltage at the feedback capacitor during the low power mode such that the stored voltage is available at the input of the comparator which provides an output to the charge pump to enable the charge pump during a subsequent transition from the low power mode to the operational mode.

2. The method of claim 1 further comprising:
   discharging the voltage trimming circuit to a circuit ground (GND) during the low power mode; and
   disabling the comparator during the low power mode.

3. The method of claim 1 further comprising:
   determining the DC-DC converter is to be transitioned from the low power mode to the operational mode;
   operating the comparator based on the voltage stored in the feedback capacitor to the comparator; and
   coupling the voltage trimming circuit to the comparator.

4. The method of claim 3, wherein the voltage stored in the feedback capacitor identifies a differential voltage across the feedback capacitor that is determined based on a difference between the voltage trimming value determined at a time of the storing, and an output voltage of the charge pump.

5. The method of claim 3, wherein the coupling of the voltage trimming circuit to the comparator occurs after a designated delay.

6. The method of claim 5, wherein an output voltage of the voltage trimming circuit stabilizes during the designated delay, and wherein the charge pump transitions from the low power mode to the operational mode prior to the output voltage of the voltage trimming circuit stabilizing.

7. The method of claim 3, wherein the coupling and decoupling are implemented using a switch.

8. The method of claim 1, wherein the DC-DC converter is implemented in a voltage supply block of a nonvolatile memory.

9. A device comprising:
a charge pump;
a voltage trimming circuit;
a feedback regulation loop coupled to the charge pump, the feedback regulation loop comprising:
 a comparator comprising an output, a first input, and a second input, the output being coupled to an input of the charge pump;
 a feedback capacitor comprising a first node and a second node, the first node being coupled to an output of the charge pump, and the second node being coupled to the first input of the comparator, the feedback capacitor being configured to store a voltage that is available at an input of the comparator which provides an output to the charge pump to enable the charge pump during a transition from a low power mode to an operational mode; and
a switch coupled between an output of the voltage trimming circuit and the second node of the feedback capacitor, wherein in the low power mode, the switch is configured to uncouple the voltage trimming circuit from the feedback regulation loop, and wherein in the operational mode, the switch is configured to couple the voltage trimming circuit with the feedback regulation loop.

10. The device of claim 9, wherein when transitioning from the low power mode to the operational mode, the switch is configured to couple the voltage trimming circuit with the feedback regulation loop after a designated delay.

11. The device of claim 10, wherein the output voltage of the voltage trimming circuit stabilizes during the designated delay, and wherein the charge pump transitions from the low power mode to the operational mode prior to the output voltage of the voltage trimming circuit stabilizing.

12. The device of claim 9, wherein the voltage stored in the feedback capacitor represents a differential voltage across the feedback capacitor that is determined based on a difference between a voltage trimming value and an output voltage of the charge pump.

13. The device of claim 9, wherein the voltage trimming circuit is configured to be discharged to ground (GND) during the low power mode, and wherein the comparator is configured to be disabled during the low power mode.

14. The device of claim 9, wherein the second input of the comparator is coupled to a reference voltage.

15. The device of claim 9, wherein the voltage trimming circuit comprises a diode stack.

16. The device of claim 9, wherein the device is a DC-DC converter included in a voltage supply block of a nonvolatile memory.

17. A system comprising:
a nonvolatile memory;
a voltage supply block comprising:
 a charge pump;
 a voltage trimming circuit;
 a feedback regulation loop coupled to the charge pump, the feedback regulation loop comprising:
  a comparator comprising an output, a first input, and a second input, the output being coupled to an input of the charge pump;
  a feedback capacitor comprising a first node and a second node, the first node being coupled to an output of the charge pump, and the second node being coupled to the first input of the comparator, the feedback capacitor being configured to store a voltage that is available at an input of the comparator which provides an output to the charge pump to enable the charge pump during a transition from a low power mode to an operational mode; and
 a switch coupled between an output of the voltage trimming circuit and the second node of the feedback capacitor, wherein in the low power mode, the switch is configured to uncouple the voltage trimming circuit from the feedback regulation loop, and wherein in the operational mode, the switch is configured to couple the voltage trimming circuit with the feedback regulation loop.

18. The system of claim 17, wherein when transitioning from the low power mode to the operational mode, the switch is configured to couple the voltage trimming circuit with the feedback regulation loop after a designated delay, wherein the output voltage of the voltage trimming circuit stabilizes during the designated delay, and wherein the charge pump transitions from the low power mode to the operational mode prior to the output voltage of the voltage trimming circuit stabilizing.

19. The system of claim 17, wherein the voltage stored in the feedback capacitor identifies a voltage trimming value.

20. The system of claim 17, wherein the voltage trimming circuit is configured to be discharged to ground (GND) during the low power mode, and wherein the comparator is configured to be disabled during the low power mode.

* * * * *